United States Patent
Perlmutter et al.

(10) Patent No.: US 10,057,390 B2
(45) Date of Patent: Aug. 21, 2018

(54) METHOD AND SYSTEM FOR MODIFYING HTTP REQUEST HEADERS WITHOUT TERMINATING THE CONNECTION

(71) Applicant: CHECK POINT SOFTWARE TECHNOLOGIES LTD., Tel Aviv (IL)

(72) Inventors: Amnon Perlmutter, Givatayim (IL); Lior Drihem, Givat Shmuel (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 248 days.

(21) Appl. No.: 14/675,775

(22) Filed: Apr. 1, 2015

(65) Prior Publication Data
US 2016/0294989 A1    Oct. 6, 2016

(51) Int. Cl.
H04L 29/06   (2006.01)
H04L 29/08   (2006.01)

(52) U.S. Cl.
CPC .............. *H04L 69/22* (2013.01); *H04L 63/02* (2013.01); *H04L 67/02* (2013.01)

(58) Field of Classification Search
CPC .......... H04L 69/22; H04L 67/02; H04L 29/06
See application file for complete search history.

(56) References Cited

U.S. PATENT DOCUMENTS

| | | | |
|---|---|---|---|
| 2004/0088349 A1* | 5/2004 | Beck | H04L 63/0407 709/203 |
| 2009/0158367 A1* | 6/2009 | Myers | G06F 9/54 725/109 |
| 2010/0235543 A1* | 9/2010 | Gmuender | H04L 29/06 709/246 |

* cited by examiner

*Primary Examiner* — Wei Zhao
(74) *Attorney, Agent, or Firm* — Mark M. Friedman

(57) ABSTRACT

Methods and systems provide mechanisms for inspection devices, such as firewalls and servers and computers associated therewith, to modify HTTP requests, without requiring the inspection device to terminate the connections at the TCP (Transport Control Protocol) level, as occurs with contemporary web proxies, e.g., web proxy servers—either explicit or implicit proxies.

11 Claims, 3 Drawing Sheets

METHOD AND SYSTEM FOR MODIFYING HTTP REQUEST HEADERS WITHOUT TERMINATING THE CONNECTION

TECHNICAL FIELD

The present invention is directed to HTTP (Hypertext Transport Protocol) headers, which are used to control access to web services.

BACKGROUND

Access to web services, for example, inspecting, blocking, redirecting, authenticating, is commonly performed by web proxy servers, which filter traffic directed at particular URLs (Uniform Resource Locators). Web proxy servers can also add HTTP headers to HTTP requests. HTTP headers are often used by web servers to define the operation of an HTTP transaction (e.g. grant or block access).

For example, to block access to some Google accounts and services while allowing access to an enterprise Google Apps account, a web proxy server that can perform SSL (Secure Sockets Layer) interception and insert the X-GoogApps-Allowed-Domains HTTP header is needed. However, when using a web proxy server, there are at least two connections, separate from each other, a first TCP (Transport Control Protocol) connection from the client to the proxy server and a second, separate connection from the proxy server to the destination web server.

The first TCP connection terminates and the web proxy server may generate a new TCP connection to the destination web server. This typically impacts performance, latency and changes in network behavior or configuration. Proxying is considered more intrusive compared to an inspection device that is not required to terminate connections at the TCP level and normally forwards the traffic without modifying the packets (at layer 3 and above). Such an inspection device in the case that is not performing TCP termination either explicit like a Web Proxy or implicit (by terminating the TCP connection) at the present can modify the HTTP request by replace bytes in the TCP segment or by shortening the TCP segment but cannot add additional data to the TCP segment, and as such, content of additional bytes of data to the HTTP request cannot be added. As a result, HTTP headers cannot be added to conventional HTTP requests.

SUMMARY OF THE INVENTION

The present invention provides mechanisms, for example, for managing packet traffic, for inspection devices, such as firewalls and servers and computers associated therewith. The inspection devices are designed to modify HTTP requests, without requiring the inspection device to terminate the connections at the TCP (Transport Control Protocol) level, as occurs with contemporary web proxies, e.g., web proxy servers—either explicit or implicit proxies.

The present invention employs a single connection between the client and the destination web server, that passes through an inspection device, representative of a gateway. This single connection is such that although the inspection device may cause a redirect should the packet header not be the proper header for the destination web server, and the connection from the client to the destination is broken, this single connection is not terminated, for upon receiving a redirect over the single connection, the inspection device will inspect packet traffic but will not terminate the connection.

This inspection device, e.g., the firewall, and servers and computers associated therewith, provide TCP/UDP (Transport Control Protocol/User Datagram Protocol) packet data for examination, without interfering with the connection itself, and therefore, not breaking or terminating the connection. Although the present invention does not terminate the connection between the client and destination web server, via the inspection device, the connection may be broken, in the following instance. This instance is one where the inspection device has the ability to inject TCP Segments at the end of the stream—close a connection, but also inject a packet with special data to the client (e.g., html page with error description or redirect).

The inspection device is configured in accordance with embodiments of the present invention such that data in a request, connection, or other electronic or data communication, can be replaced by changing a segment in a packet to another, as long as it is the same or shorter in size.

The present invention provides inspection devices, such as firewalls, and servers associated therewith, the ability to enforce HTTP header transparency.

The present invention controls, for example, by limiting, limits the accounts which users can log into, for example, on a local area (internal) or enterprise network. This process of controlling the accounts to which a user can log into is done transparently by using cookies or dummy query parameters in redirects to the browsers of each user's computer along the enterprise network, and is done without breaking or otherwise terminating the connection.

Embodiments of the present invention are directed to a method for managing packet traffic. The method comprises: analyzing a request in a Hypertext Transport Protocol Secured (HTTP/S) connection for a uniform resource locator (URL), along a network, for a predetermined header; and, should the predetermined header not be in the request; injecting a response into the connection, the injected response for: 1) redirecting a subsequent request to the URL; and 2) providing a placeholder for the predetermined header; and, replacing the placeholder in the subsequent request with the predetermined header.

Optionally, the injecting the response into the connection includes: setting a temporary cookie in the size to support the predetermined header in a client.

Optionally, the client includes a computer.

Optionally, the replacing the placeholder in the subsequent request with the predetermined header includes, replacing the temporary cookie in the subsequent request with the predetermined header.

Optionally, the injecting the response into the connection includes, adding a dummy query parameter to the URL in the size of the predetermined header.

Optionally, the replacing the placeholder in the subsequent request with the predetermined header includes replacing the dummy query parameter in the subsequent request with the predetermined header.

Optionally, the predetermined header is an HTTP (Hypertext Transport Protocol) header corresponding to the intended domain for the request.

Optionally, should the request include the predetermined header and the header does not have a correct value, and the value length is sufficient to accommodate the predetermined header; replace the header with the predetermined header.

Optionally, the method additionally comprises: should the request include the predetermined header and the header does not have a correct value and the value is not sufficient to accommodate the predetermined header; injecting a response into the connection, the injected response for: 1)

redirecting a subsequent request to the URL; and, 2) providing a placeholder for the predetermined header; and, replacing the placeholder in the subsequent request with the predetermined header.

Optionally, the method additionally comprises: transmitting the request with the predetermined header to the destination over the network.

Optionally, the method additionally comprises: transmitting the request with the predetermined header to the destination over the network.

Optionally, the method additionally comprises: transmitting the request with the predetermined header to the destination over the network.

Optionally, when the request includes a predetermined header with the correct value, transmitting the request with the predetermined header to the destination over the network.

Embodiments of the invention are directed to a computer system for managing packet traffic. The computer system comprises: a storage medium for storing computer components; and, a computerized processor for executing the computer components. The computer components comprise: a first component for analyzing a request in a Hypertext Transport Protocol Secured (HTTP/S) connection for a uniform resource locator (URL), along a network, for a predetermined header; a second component for injecting a response into the connection, the injected response for: 1) redirecting a subsequent request to the URL; and 2) providing a placeholder for the predetermined header, based on the analysis of the first component; and, a third component for replacing the placeholder in the subsequent request with the predetermined header, provided a response has been injected into the connection.

Optionally, the computer system additionally comprises: a fourth component for analyzing the value of the header in the request, based on the analysis of the first component; a fifth component for determining whether the value is sufficient to accommodate the predetermined header, based on the analysis by the fourth component; and, a sixth component for replacing the value, based on the determination by the fifth component.

Optionally, the computer system additionally comprises: a seventh component for transmitting the request with the predetermined header to the destination over the network.

Embodiments of the present invention are directed to a computer-usable non-transitory storage medium having a computer program embodied thereon for causing a suitable programmed system to manage packet traffic, by performing the following steps when such program is executed on the system. The steps comprise: analyzing a request in a Hypertext Transport Protocol Secured (HTTP/S) connection for a uniform resource locator (URL), along a network, for a predetermined header; and, injecting a response into the connection, the injected response for: 1) redirecting a subsequent request to the URL; and 2) providing a placeholder for the predetermined header, should the predetermined header not be in the request; and, replacing the placeholder in the subsequent request with the predetermined header.

Optionally, the steps additionally comprise at least one of: setting a temporary cookie in the size to support the predetermined header in a client; and, adding a dummy query parameter to the URL in the size of the predetermined header.

Optionally, the steps additionally comprise at least one of: replacing the temporary cookie in the subsequent request with the predetermined header; and, replacing the dummy query parameter in the subsequent request with the predetermined header.

Optionally, the steps additionally comprise: transmitting the request with the predetermined header to the destination over the network.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

HTTP (Hypertext Transfer Protocol) is an application protocol for distributed, collaborative, hypermedia information systems. Hypertext is structured text that uses logical links (hyperlinks) between nodes containing text. HTTP is the protocol to exchange or transfer hypertext.

URL (Uniform Resource Locator) is a reference to a resource that specifies the location of the resource on a computer network and a mechanism for retrieving it, such as an address of a specific Web site or file on the Internet.

SSL (Secure Sockets Layer) is a standard security technology for establishing an encrypted link between a server and a client—for example, a web server (website) and a browser; or a mail server and a mail client.

TCP (Transport Control Protocol) is a protocol developed for the Internet for transporting data between network devices.

UDP (User Datagram Protocol) is a communications protocol that offers a limited amount of service when messages are exchanged between computers in a network that uses the Internet Protocol (IP). UDP is an alternative to the Transmission Control Protocol (TCP) and, together with IP, is sometimes referred to as UDP/IP.

A "firewall" is a network security system, either hardware-based or software-based, that controls incoming and outgoing network traffic based on a set of rules.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
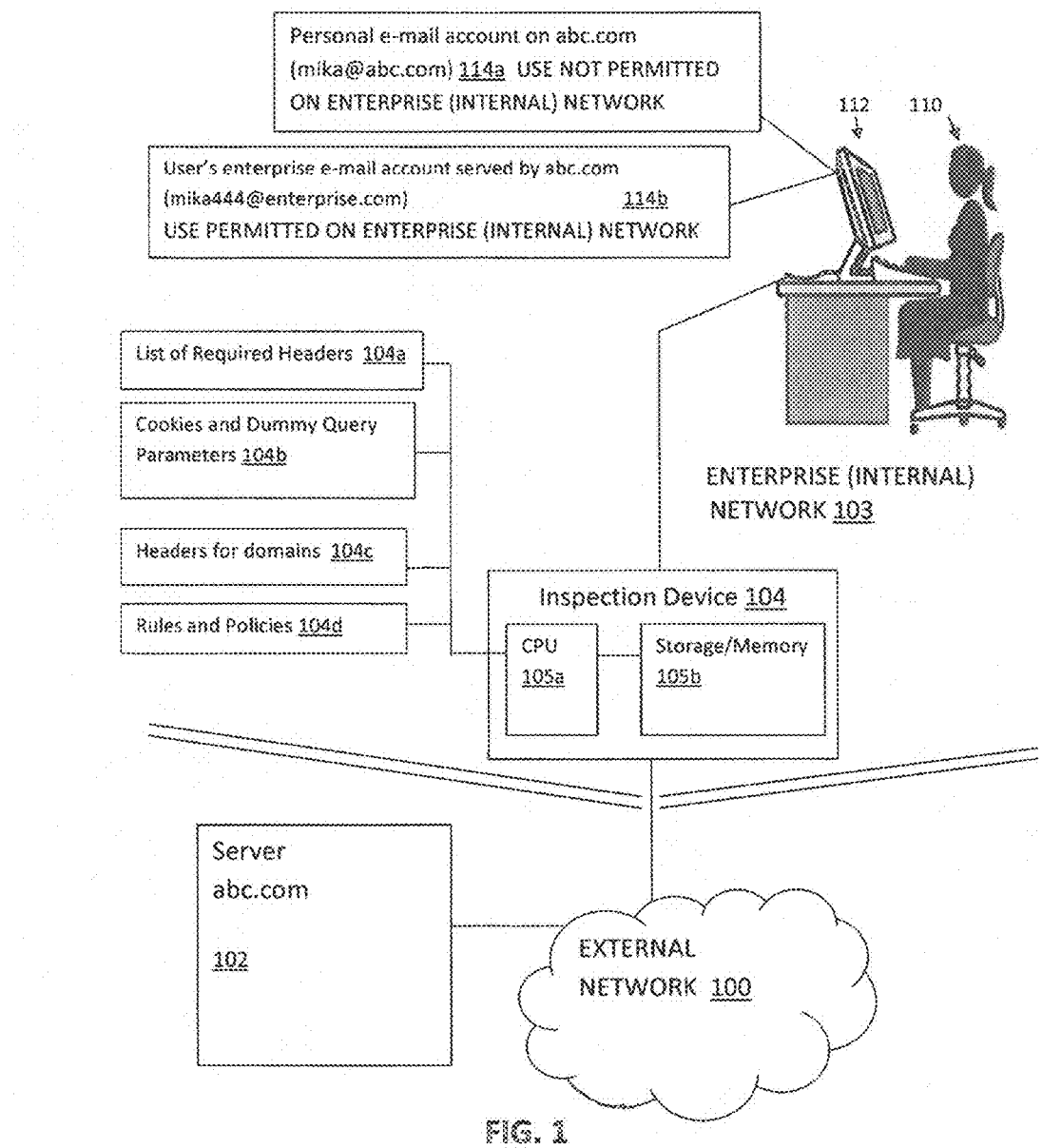
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

Reference is now made to FIG. 1, which shows an exemplary operating environment, including a network 100, to which is linked a server 102, representative of the multitudes of servers that link to the network. For example, the server 102 is configured to enforce a specific domain, such as the domain "abc.com." The network 100 is an external network, which links to an internal network (shown as separated from the external network 100 by the double lines), such as a local network, for example, an enterprise network 103, which is protected by an inspection device 104, which links to the external network 100.

The inspection device 104, is for example, one or more computers, with processors (CPU 105a), linked to storage/memory 105b. The storage/memory 105b stores machine-executable instructions executed by the CPU 105a for performing the processes of the invention, for example, those detailed in FIGS. 2 and 3, which when programmed accordingly in to the CPU 105a, serve as a firewall, between the internal network, e.g., local or enterprise network 103, and the external network 100. There may also be additional servers associated with the inspection device 102, typically when the inspection device 104 is a firewall. The inspection device 104 is associated with modules, engines and other computer components for performing the processes of the invention as disclosed herein. The inspection device, and the servers, computers and the like associated therewith also include storage media, databases and the like, which include, for example, a list of required headers 104a, cookies 104b, including those for specific domains, headers 104c for placement into requests when the request with a cookie reaches the inspection device 104, and stored rules and policies 104d for the inspection device 104.

A user 110, via her computer 112, on the internal network (e.g., the enterprise network 103), links to the inspection device 104, in order to access the external network 100. The computer 112 is a "client" or "client computer." The user 110, for example, has two e-mail accounts, one personal (consumer) 114a, e.g., mika@abc.com, and one, e.g., mika444@enterprise.com, for the enterprise 114b that hosts the internal network 103 (the enterprise network), that for example, are both supported and enforced by a domain (e.g., the domain abc.com), represented, for example, by the server 102 which hosts the domain "abc.com." For purposes of the description of the disclosed subject matter, the enterprise, the entity that typically controls the internal network and the inspection device 104, does not permit its users, represented by the user 110, to use their personal domain abc.com accounts 114a, but will allow use of the user's 110 enterprise domain enterprise.com email account 114b. The entity controlling the domain server 102 provides the administrator of the enterprise network and the inspection device 104, the option to add a header(s) to transmitted (to the external network 100) HTTP requests, in order to enforce certain accounts at the domain (e.g., server 102).

The external network 100 is, for example, a communications network, such as a Local Area Network (LAN), or a Wide Area Network (WAN), including public networks such as the Internet. As shown in FIG. 1, the external network 100 is, for example, the Internet. The external network 100, although shown as a single network, may be a combination of networks and/or multiple networks including, for example, cellular networks. "Linked" as used herein includes both wired or wireless links, either direct or indirect, such that the computers, including, servers, components and the like, are in electronic and/or data communications with each other.

Figure 2:
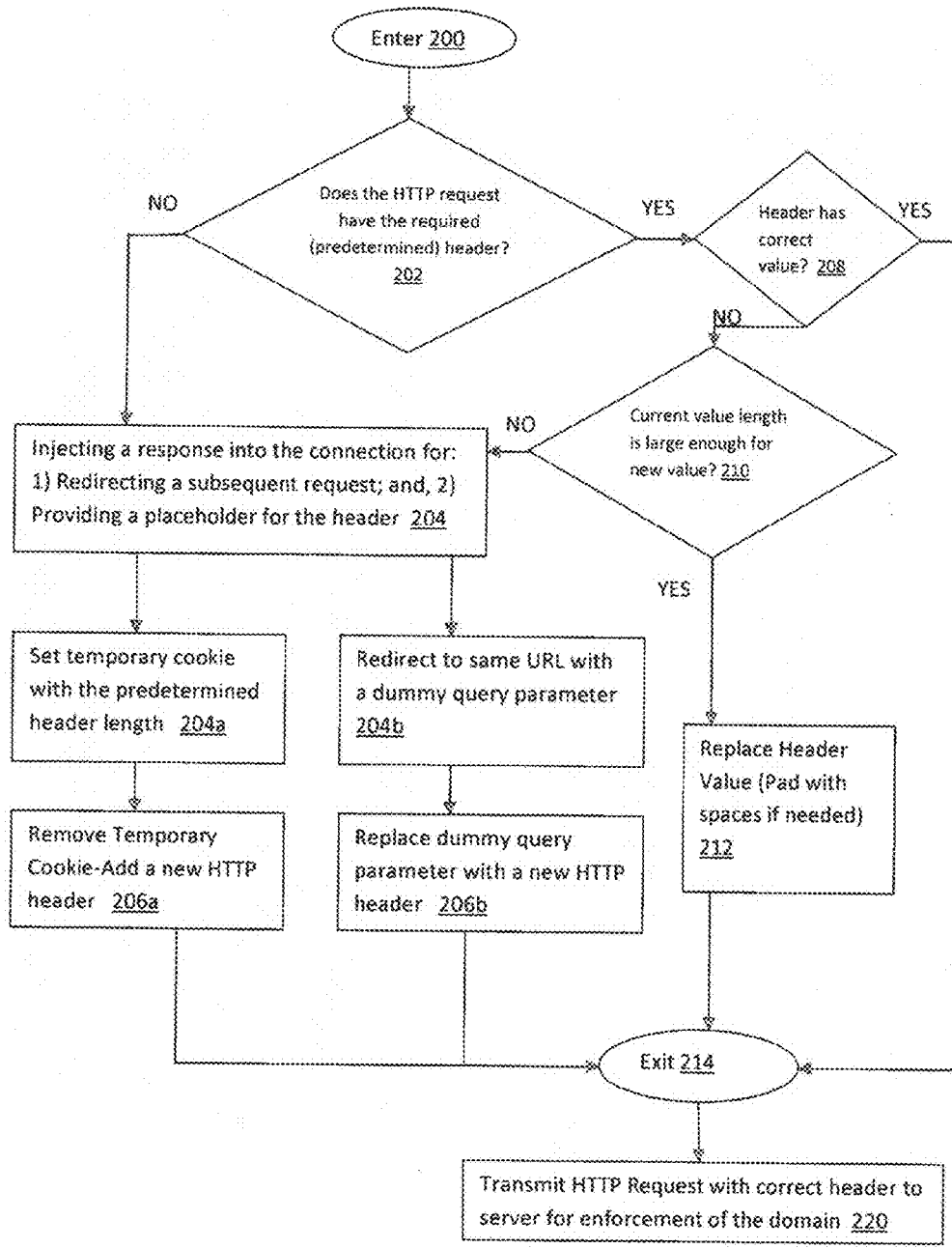
FIG. 2 is a flow diagram of processes in accordance with embodiments of the disclosed subject matter; and, FIG. 3 is a diagram showing an exemplary operation of an embodiment of the present invention.

Attention is now directed to FIG. 2 which shows a flow diagram detailing a computer-implemented process in accordance with embodiments of the disclosed subject matter. Reference is also made to elements shown in FIG. 1. The process and subprocesses of FIG. 2 are computerized processes performed by the inspection device 104, in conjunction with the client, for example, the user computer 112, which as shown represents a client or client computer. The aforementioned processes and sub-processes can be, for example, performed manually, automatically, or a combination thereof, and, for example, in real time.

FIG. 2 is a process, including subprocesses, that describe modification of headers of HTTP requests (HTTP request headers), allowing for an inspection device 104, typically within a local area network, such as an internal or enterprise network, to enforce the headers, while an external server, computer or the like, enforces a specific domain, for example, for TCP traffic.

Initially, HTTP requests from the computer 112 of the user 110, will be described for the process of FIG. 2. At block 200, an HTTP request from the user computer 112 has reached and entered the inspection device 104. This HTTP request is, for example, a request to log on to her computer 112, by the user 110. The request includes the browser sending a HTTP GET request with the user's credentials to the domain, represented by the server 102 for the domain. At block 202, the inspection device 104 inspects the HTTP request and determines whether the HTTP request has the required header for the domain to which it belongs.

Should the required header, for example, a predetermined, preselected, or otherwise preassigned header, e.g. an HTTP header, not be present in the HTTP request, the process moves to block 204. At block 204, the inspection device 104 closes a connection, and injects a response, e.g., a packet (although multiple packets are also permissible) into the connection, for 1) redirecting a subsequent request; and, 2) providing a placeholder for the header. The connection is, for example, an HTTP/S (Hypertext Transport Protocol Secure) connection. For example, this response injection may be done by the inspection device 104 injecting a packet to redirect this request to the same URL, while making sure that the next request will have a placeholder for the required HTTP header(s). This can be done by answering with "HTTP/1.1 301 Moved Permanently." The HTTP response status code "301 Moved Permanently" is used for permanent URL redirection, meaning current links or records using the URL that the response is received for, should be updated, and one of the following two subprocesses is performed.

The process of block 204 then moves to one of blocks 204a or 204b. These blocks, paired with their corresponding blocks 206a, 206b represent various subprocesses.

A first subprocess involves, the inspection device 104 setting a temporary cookie in the size of the required header, in the client, e.g., client computer 112, with the predetermined header length at block 204a. For example, the size is such that it supports a new HTTP header stored in association with the inspection device 104, for example in storage 104c. A "cookie" includes, for example, a small piece of data or small data file sent from the inspection device 104 to the user computer 112 and is stored in a user's computer, for example, in the browsing application. The next request, to the redirected URL, e.g., a request to the server 102, from the client computer 112, includes this cookie. When the request is at the inspection device 104, the inspection device 104 replaces the cookie and its data by first removing the data from the header of the cookie, and then use the cookie's buffer size to set the size (length) required for the HTTP header(s), which will replace the cookie.

Alternately, a second subprocess involves the inspection device 104 adding a dummy query parameter to the URL in the size of the required header, for example, a long URL, and redirecting the request to the same URL, at block 204b. This long URL forces the next or subsequent request to be longer than the previous request, so that it can be modified with an HTTP header corresponding to the requisite domain. The URL (long URL) of the next request will include this query parameter. The inspection device 104 will use the ability to replace data, restore the URL to the original URL, and use its buffer size to set the required HTTP header.

The process of block 204a moves to block 206a, where the inspection device 104 replaces the cookie with the HTTP header(s) for the specific domain of the HTTP request, e.g., enterprise.com. For example, a new HTTP header is added.

Alternatively, the process of block 204b moves to block 206b, should a dummy query have been used the long URL is modified with an HTTP header corresponding to the requisite domain.

From blocks 206a and 206b, the process moves to block 214, where the HTTP request, with the header for the domain, exits the inspection device 104.

Figure 3:
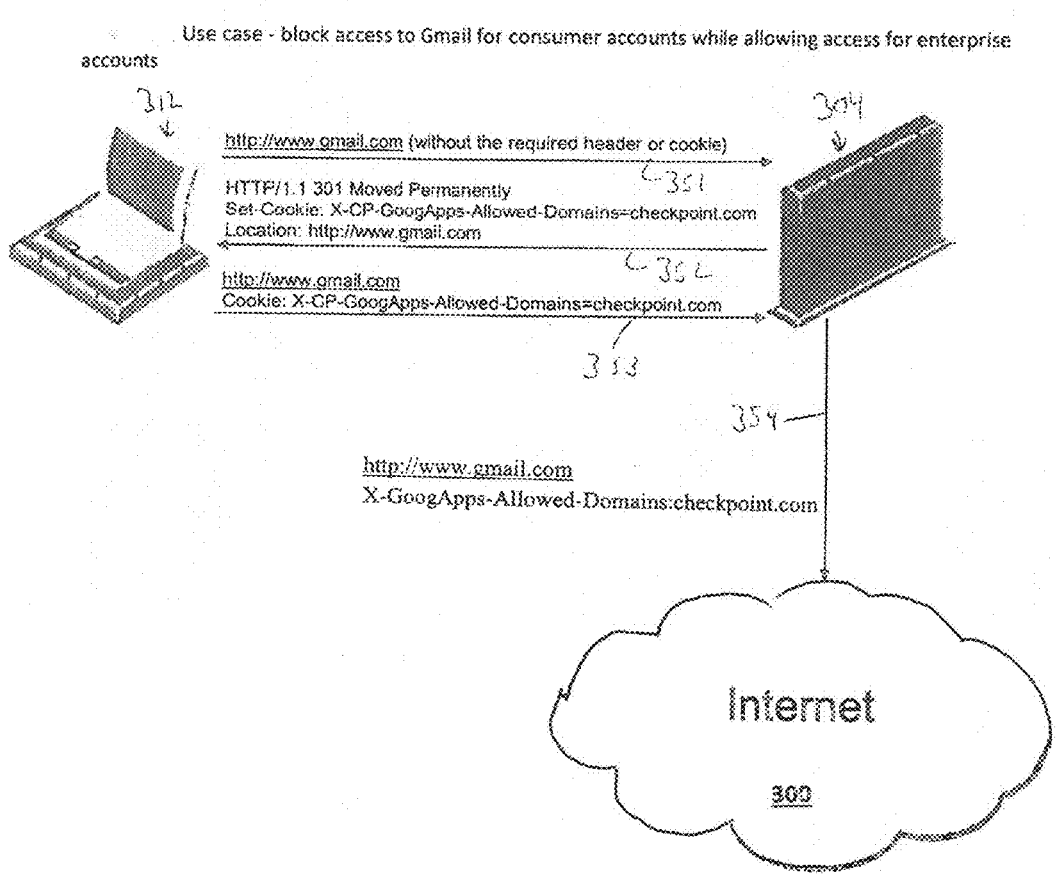

Returning to block 202, should the HTTP request have the required header, the process moves to block 208. At block 208 it is determined whether the header of the HTTP request has the correct value, in accordance with the rules and policies (stored in storage 104d) as programmed into the inspection device 104. The value is, for example, the header value, which is a correct email domain, such as "enterprise.com" in FIG. 1, and "checkpoint.com" in FIG. 3. In a cookie, for example, the cookie "X-CP-GoogApps-Allowed-Domains=checkpoint.com", as shown in FIG. 3, the cookie is arranged as "Header Name:Header Value", where the Header Name is "X-CP-GoogApps-Allowed-Domains" and the Header Value is "checkpoint.com" (as a header, as described herein, includes a name and a value). Should the header have the correct value, the process moves to block 214, where the HTTP request, with the header for the domain, exits the inspection device 104.

At block 208, should the header exist but have the wrong value, the process moves to block 210. At block 210, it is then determined whether the current value (value length) is of a length (size) sufficient to accommodate a new value. For example, if the current value is HEADER: abc.com and should be HEADER: enterprise.com, the current value is not large enough. For example, from FIG. 1, since "enterprise" has 10 characters (places or spaces) as its value, the header length, and accordingly value, is larger than "abc", which is three characters (places or spaces) as its value.

At block 210, should the length be sufficient (large enough), the process moves to block 212, where the inspection device 104 overwrites the header value, with the required value. In overwriting with the required value, spaces can be put in the extra bytes of the new length, for the header value. The process moves to block 214, where the HTTP request, with the header for the domain, exits the inspection device 104.

Returning to block 210, should the length (size) be insufficient, the process moves to block 204, and proceeds to blocks 206 and 214, as detailed above, in order to use the same mechanisms detailed in these blocks to enlarge the HTTP request.

From block 214, the HTTP request with the header added by the inspection device in the process of blocks 200 to 214, is transmitted to the server of the domain, e.g., server 102 for the domain abc.com, for enforcement of the domain, at block 220. Enforcement at the domain includes authenticating the user, by analyzing passwords, e-mail addresses, user names, and the like. For example, at block 220, the server 102 may look at the password presented upon the user 110 logging onto her email account. If only the user's enterprise account for that domain is usable on the internal (e.g., enterprise) network, should the log on be with the password for the personal account, access to this personal email account is denied. However, should the user 110 enter her enterprise password, and it matches the corresponding password in the server 102, the user will open her enterprise e-mail account.

Throughout the entire process of blocks 200 to 214, and from block 214 to block 220, the connection or link from the computer 112 of the user 110 to the inspection device 104 and the external network 100, operates without changing the topology of the internal network 103, and for example, the connection is not terminated, and remains open. Additionally, the HTTP header was added in a transparent manner, and traffic flow has not been changed.

FIG. 3 shows an example where access to Gmail is blocked for consumer (personal or individual) while allowing access for enterprise, e.g., Checkpoint (CP) accounts. FIG. 3 shows an external network 300, similar to external network 100 (detailed above), an inspection device 304 in the form of a firewall, protecting the internal or enterprise network, and a user computer 312 linked to the internal network. The inspection device 304, internal network, and user computer 312, are similar to that, e.g., inspection device 104, internal (enterprise network) and user computer 112, respectively, as detailed above in FIG. 1.

Initially, as represented by arrow 351 a user, via the user (client) computer 312, logs onto her computer with her browser directed to the URL for gmail, http://www.gmail.com. The browser transmits an HTTP request (first HTTP request) to the inspection device 304. This request does not have the required header or cookie.

The inspection device 304 then sends a redirect request including a cookie to the browser of the client computer 312, as indicated by the arrow 352. In accordance with HTTP/1.1 301 Moved Permanently, the cookie is set (stored) by the browser with the command:

Set Cookie: X-CP-GoogApps-Allowed-Domains-checkpoint.com

The cookie is then transmitted to the inspection device with a subsequent (second) HTTP request, represented by arrow 353. This subsequent HTTP request is for a destination on the external network, here, http:www.gmail.com, which includes the cookie as follows:

Cookie: X-CP-GoogApps-Allowed-Domains=checkpoint.com

The inspection device 104 reads the cookie, and since it is a proper cookie for the domain of the intended destination. e.g., the URL www.gmail.com, replaces the cookie with a header, as follows:

X-GoogApps-Allowed-Domains:checkpoint.com

The HTTP request with the header is forwarded to the destination, http://gmail.com, along the external network 100, as indicated by the arrow 354.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for managing packet traffic comprising:
   analyzing a request for a predetermined header in a Hypertext Transport Protocol Secured (HTTP/S) connection for a uniform resource locator (URL), the HTTP/S connection between a client and a server associated with the URL over a network; and,
   should the predetermined header not be in the request,
      injecting a response into the HTTP/S connection, the injected response for: 1) redirecting a subsequent request to the URL; and 2) providing a placeholder for the predetermined header; and,
      replacing the placeholder in the subsequent request with the predetermined header including, setting a temporary cookie, in the subsequent request, in a size to support the predetermined header in the client;
   the analyzing, the injecting, the replacing, and the setting the temporary cookie, are performed by an inspection device located between the client and the server; and,
   the HTTP/S connection remains open.

2. The method of claim 1, wherein the replacing the placeholder in the subsequent request with the predetermined header additionally includes, replacing the temporary cookie in the subsequent request with the predetermined header.

3. The method of claim 1, wherein the predetermined header is an HTTP (Hypertext Transport Protocol) header corresponding to an intended domain for the request.

4. The method of claim 1, additionally comprising:
   transmitting the subsequent request with the predetermined header to a destination over the network.

5. The method of claim 1, wherein the HTTP/S connection is not terminated by the inspection device.

6. A computer system for managing packet traffic comprising:
   an inspection device, for inspecting packet traffic in a request in a Hypertext Transport Protocol Secured (HTTP/S) connection for a uniform resource locator (URL), between a client and a server associated with the URL over a network, comprising:
      a storage medium for storing computer components; and,
      a computerized processor for executing the computer components, the computer components comprising:
         a first component for analyzing a request in a Hypertext Transport Protocol Secured (HTTP/S) connection for a uniform resource locator (URL), between the client and the server associated with the URL over the network, to determine the presence of a predetermined header in the request;

a second component, responsive to the determination that the predetermined header is not present in the request, for injecting a response into the HTTP/S connection, the injected response for: 1) redirecting a subsequent request to the URL, and, 2) providing a placeholder for the predetermined header; and, a third component for replacing the placeholder in the subsequent request with the predetermined header including: 1) setting a temporary cookie, in the subsequent request, in a size to support the predetermined header in the client, and, 2) replacing the temporary cookie, in the subsequent request, with the predetermined header;

wherein the first component, the second component, and the third component operate while the HTTP/S connection remains open.

7. The computer system of claim 6, additionally comprising:

a fourth component for transmitting the subsequent request with the predetermined header to a destination over the network, while the HTTP/S connection remains open.

8. The computer system of claim 6, wherein the inspection device does not terminate the HTTP/S connection.

9. A computer-usable non-transitory storage medium having a computer program embodied thereon for causing a suitably programmed system, including an inspection device, to manage packet traffic between a server and a computer associated with a client, by performing the following steps when such program is executed on the system, the steps comprising:

analyzing a request for a predetermined header, in a Hypertext Transport Protocol Secured (HTTP/S) connection for a uniform resource locator (URL), between the client and a server associated with the URL over a network;

injecting a response into the connection, should the predetermined header not be in the request, the injected response for: 1) redirecting a subsequent request to the URL, and, 2) providing a placeholder for the predetermined header;

replacing the placeholder in the subsequent request with the predetermined header including: 1) setting a temporary cookie, in the subsequent request, in a size to support the predetermined header in the client, and, 2) replacing the temporary cookie, in the subsequent request, with the predetermined header; and, keeping the HTTP/S connection open between the client and the server.

10. The computer-usable non-transitory storage medium of claim 9, wherein the steps additionally comprise:

transmitting the subsequent request with the predetermined header to a destination over the network.

11. The computer-usable non-transitory storage medium of claim 9, wherein the keeping the HTTP/S connection open between the client and the server includes causing the inspection device not to terminate the HTTP/S connection.

* * * * *